United States Patent [19]

Herczog

[11] 4,065,636

[45] Dec. 27, 1977

[54] HERMETIC ENCLOSURE FOR ELECTRONIC COMPONENT

[75] Inventor: Andrew Herczog, Painted Post, N.Y.

[73] Assignee: Corning Glass Works, Corning, N.Y.

[21] Appl. No.: 569,186

[22] Filed: Apr. 18, 1975

Related U.S. Application Data

[62] Division of Ser. No. 454,289, March 25, 1974, Pat. No. 3,918,147.

[51] Int. Cl.² ............................................. H01G 9/10
[52] U.S. Cl. .................................. 174/52 S; 361/433
[58] Field of Search ................ 174/52 S, 50.61, 50.53, 174/50.52, 152 GM; 317/230; 29/570; 65/59 R, 59 A, 59 B; 403/28, 29, 30; 361/433

[56] References Cited

U.S. PATENT DOCUMENTS

| 3,264,708 | 8/1966 | Diggens | 29/570 X |
| 3,273,028 | 9/1966 | Sparkes | 174/50.61 X |
| 3,548,265 | 12/1970 | Buice et al. | 317/230 |
| 3,912,985 | 10/1975 | Sawchuck | 174/50.5 Z X |

FOREIGN PATENT DOCUMENTS

| 906,595 | 3/1954 | Germany | 174/152 GM |
| 892,830 | 3/1962 | United Kingdom | 65/59 B |
| 1,006,929 | 10/1965 | United Kingdom | 174/152 GM |

Primary Examiner—J. V. Truhe
Assistant Examiner—D. A. Tone
Attorney, Agent, or Firm—Walter S. Zebrowski; Clarence R. Patty, Jr.

[57] ABSTRACT

A hermetic enclosure for an electrical component, particularly for a tantalum capacitor, and a method of forming it is disclosed. A silver container is provided having an open end at which an outwardly protruding flange is formed. A quantity of sealing glass is sealed to a lead and formed into a bead about the lead intermediate the ends thereof. A metallic collar having an outwardly protruding flange is disposed about the bead. This assembly and a metallic band, having a temperature coefficient of expansion greater than the glass bead, is heated and the metallic band is disposed about the collar so as to place the collar and glass bead in compression upon cooling thereby effecting a compression seal between the collar and the glass bead. A hermetic seal is then effected between the outwardly protruding flange of the container and the outwardly protruding flange of the collar.

6 Claims, 1 Drawing Figure

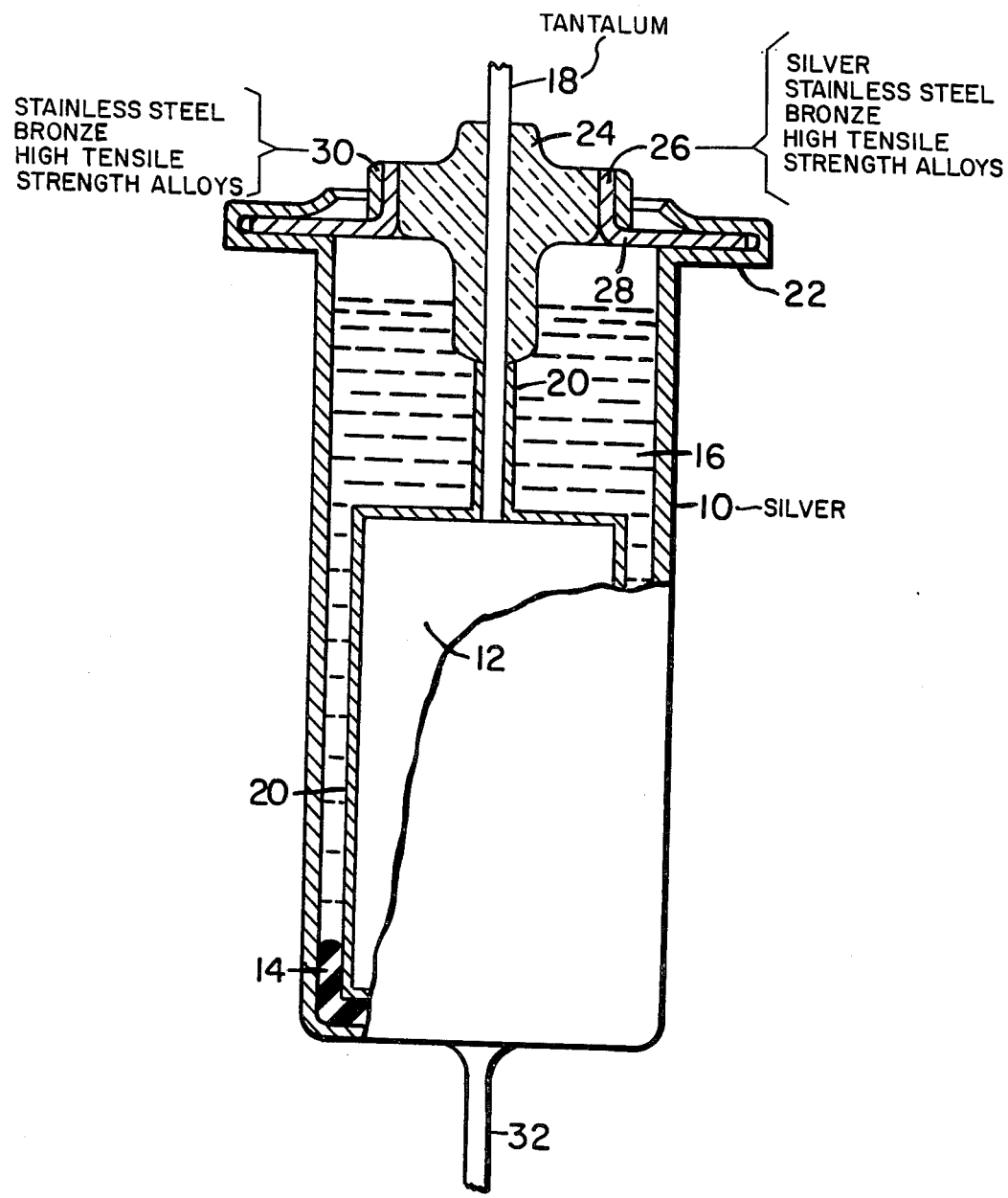

HERMETIC ENCLOSURE FOR ELECTRONIC COMPONENT

CROSS-REFERENCE TO RELATED APPLICATION

This is a division of application Ser. No. 454,289 filed Mar. 25, 1974, now U.S. Pat. No. 3,918,147 issued Nov. 11, 1975.

BACKGROUND OF THE INVENTION

1. Field of the Invention

The present invention relates to enclosing of any electrical component but in particular electrical components having gaseous or liquid matter which may leak or escape.

2. Description of the Prior Art

In the manufacture of wet tantalum capacitors, it has been necessary to enclose a porous tantalum slug properly positioned within the metal container by means of a plastic sleeve or cup. A substantially liquid acidic electrolyte was disposed in between the slug and the contaner. A substantially inert plastic element was inserted on top of the slug and the container was crimped to hold the plastic element and thereby the tantalum slug in place. On top of the plastic element, the container is enclosed with the help of a concentric metal to glass to metal seal having its inside metal portion soldered to the lead and its outside metal ring to the container. The lead extends beyond the closure. The liquid seal takes place between the plastic element and the crimped container walls and perhaps at the glass to metal seal and soldered joints as well, which is undesirable if the metal parts are not all corrosion resistant. It has been found, however, that such prior art construction permits the leakage of the electrolyte after a period of time through corrosion or otherwise thereby rendering the device inoperative. Furthermore, such construction requires costly equipment and complicated assembly work.

SUMMARY OF THE INVENTION

The objects of this invention are to provide an electronic device enclosure, assembly, and method of manufacture which is economical, provides a hermetic seal for the leads and the container, and overcomes the heretofore noted disadvantages.

Broadly, according to the present invention, a silver container open at one end is provided. A unitary outwardly protruding flange is formed at the open end from the container material. To the tantalum component lead a quantity of sealing glass is sealed to form a bead about the lead intermediate the ends thereof. A metallic collar having an outwardly protruding flange is disposed about the bead. The metallic collar and glass bead together with a metallic band, having a temperature coefficient of expansion greater than the glass bead, is heated and the metallic band is disposed about the collar so as to place the collar and the glass bead in compression upon cooling, thereby effecting a compression seal between the collar and the glass bead. The outwardly protruding flange of the collar is disposed adjacent the outwardly protruding flange of the container and hermetic seal is effected between these flanges. Thereby, an electrical component attached to the lead is hermetically enclosed within the container. A second lead may thereafter be attached to the container at the end opposite the open end.

Additional objects, features, and advantages of the present invention wll become apparent to those skilled in the art, from the following detailed description and the attached drawing are which, by way of example, only the preferred embodiment of this invention is illustrated.

BRIEF DESCRIPTION OF THE DRAWING

The single FIGURE is a cross-sectional view of an electronic device encapsulated in accordance with the present invention.

DETAILED DESCRIPTION

It is to be noted that the drawing is illustrative and symbolic of the invention, and there is no intention to indicate scale or relative proportion of the elements shown therein. For the purposes of simplicity, the present invention will be described in connection with a hermetic enclosure for a wet tantalum capacitor, however, the present invention is in no way limited to such an enclosure, rather is applicable to any enclosure for an electronic or other device.

Referring to the drawing, there is shown housing 10 within which a porous tantalum slug 12 is disposed. The preferred material for housing or container 10 is silver. Porous tantalum slug 12 may be positioned within housing 10 by any means known in the art such as, for example, a synthetic rubber cup-like member or boot 14 formed of material electrically and chamically compatible with the various materials of the capacitor. An electrolyte gel 16 is disposed within housing or container 10 totally immersing porous tantalum slug 12. A tantalum lead 18 is affixed to porous tantalum slug 12 and extends a sufficient distance outside the container so as to permit an external lead to be attached thereto. As is well understood, a film 20 of $Ta_2O_5$ is formed on the surface of the enclosed portion of tantalum lead 18 and slug 12. An outwardly protruding unitary flange 22 is formed of the housing material at the open end of housing 10. A quantity of dielectric sealing glass is sealed to lead 18 to form a bead 24 about lead 18 intermediate the ends thereof. An example of a suitable dielectric sealing glass is as follows in weight percent on an oxide basis: $SiO_2$ 65 percent, $Al_2O_3$ 7 percent, $B_2O_3$ 10 percent, $Li_2O$ 3 percent, $Na_2O$ 2 percent, BaO 6 percent, $Fe_2O_3$ 3 percent, and F 4 percent.

A metallic collar 26 formed of a material which can be hermetically sealed to the material of container 10 is formed within outwardly protruding flange 28. A suitable material for metallic collar 26 for sealing to a silver container 10 is silver. A metallic band 30 is formed to closely fit about metallic collar 26 and is formed of a material having a temperature coefficient of expansion greater than that of the glass bead. Materials suitable for metallic band 30 are stainless steels, bronzes, and other high tensile strength alloys. Thereafter, glass bead 24, collar 26, and metallic band 30 are heated to a temperature sufficient to provide a compression seal, such for example as a temperature below about 600° C. Metallic collar 26 is then disposed about glass bead 24 and metallic band 30 is then fitted around collar 26. Upon cooling, collar 30 having a greater temperature coefficient of expansion than the glass bead will shrink than the glass bead placing the collar and the glass bead in compression thereby effecting a compression seal between the collar and the glass bead. The tantalum slug with its lead 18 and the glass bead, metallic collar, and metallic band assembly is then disposed with the porous slug 12 within housing or container 10, the tantalum slug being immersed in electrolyte gel 16. Outwardly protruding flange 28 is thereby disposed adjacent outwardly protruding flange 22. The peripheral portion of outwardly protruding flange 22 is then crimped over to sandwich outwardly protruding flange 28 as shown in the drawing. The two outwardly protruding flanges are then hermetically sealed together by ultrasonic welding or the like in a manner well known in the art.

As will be readily understood, tantalum slug 12 forms one electrode of the capacitor while housing 10 forms the other electrode. A second lead 32 is attached to housing 10 by any means known in the art such, for example, as welding or soldering.

It will also be understood that the preceding description has assumed that in the construction of a tantalum capacitor, the material of metallic collar 26 must generally be formed of a rather ductile material such as silver or the like for corrosion resistance to sulfuric acid and good sealing to the silver housing. If, however, metallic collar 26 may be formed of less ductile material, such as those suitable for metallic band 30 but without corrosion problems, then a compression seal could be effected between metallic collar 26 and glass bead 24 without an additional metallic band 30.

As a typical example, an enclosure is formed by first preparing a cylindrical container or housng of silver. The housing is formed closed at one end so as to have a cavity sufficiently large to receive an electrical component such as a porous tantalum slug. At the open end of the housing an outwardly protruding flange is formed. At the bottom of the housing cavity a cup shaped member formed of Viton a fluoroelastomer rupper produced by E. I. du Pont de Nemours & Co., Inc. is disposed within which the tantalum slug will be deposited. A tantalum lead is welded to the tantalum slug or may be impressed within the slug during the sintering process thereof. A quantity of sealing glass such as that heretofore described, is sealed to the tantalum lead intermediate the ends thereof to form a glass bead. A silver collar having an outwardly protruding flange is provided as a type 316 stainless steel band. The glass bead, silver collar, and stainless steel band are heated to a temperature somewhat below 600° C. and the silver collar is disposed about the glass bead with the stainless steel band snugly fitted around the silver collar. As this assembly is permitted to cool, the stainless steel band having a temperature coefficient of expansion substantially greater than that of the glass bead will place the silver collar and glass bead in the compression thereby effecting a compression seal between the silver collar and the glass bead.

An electrolyte gel formed of a mixture of 38% sulfuric acid and an anhydrous and particulate colloidal silica material commercially known as Cab-O-Sil available from the Cabot Corporation of Boston, Mass. is disposed within the container. The tantalum slug with the tantalum lead and glass bead assembly is disposed within the container and snuggly fitted within a cup-shaped member in a manner so that the lead protrudes from the open end of the container and the electrolyte gel completely covers the tantalum slug. The outwardly protruding flange of the silver collar is disposed adjacent the outwardly protruding flange formed at the open end of the container. The container flange is then crimped around the collar flange and the flanges are then ultrasonically welded.

An external lead of nickel wire or the like may be attached to the tantalum lead by electric welding, while a second lead is attached to the closed end of the housing by silver soldering or the like thereby completing the capacitor.

It has been found that enclosures formed in accordance with the present invention are hermetic and do not permit the leakage of an electrolyte gel during the operation of the device environmental stress.

Although the present invention has been described with respect to details of certain embodiments thereof it is not intended that such details be limitations upon the scope of the invention except insofar as set forth in the following claims.

I claim:

1. An enclosure comprising
a silver container open at one end, said container having a tubular wall portion and a unitary outwardly protruding flange at said open end, said unitary outwardly protruding flange having a U-shaped cross-section and having two substantially parallel walls which are in a plane substantially perpendicular to said wall portion,
an electrical component having a metallic lead extending from one end thereof, said component being disposed within said container,
a glass bead sealed to said lead along its length intermediate the ends thereof, and
a metallic collar having a temperature coefficient of expansion greater than said glass bead fitted about said glass bead so as to place said glass bead in compression thereby effecting a compression seal between said collar and said glass bead, said metallic collar having a unitary outwardly protruding flange in a plane substantially perpendicular to said collar and disposed between and in contact with said two walls of said unitary outwardly protruding flange of said container, said unitary outwardly protruding flange of said collar being hermetically sealed to the unitary outwardly protruding flange of said container.

2. The enclosure of claim 1 wherein said outwardly protruding flange of said container is crimped about said outwardly protruding flange of said collar.

3. The enclosure of claim 1 wherein said lead is formed of tantalum.

4. The enclosure of claim 1 wherein said metallic collar is formed of stainless steel.

5. The enclosure of claim 1 wherein said outwardly protruding flange of said collar is welded to said outwardly protruding flange of said container.

6. The enclosure of claim 1 further comprising a second lead electrically connected to the end of said container opposite said open end.

* * * * *